(12) United States Patent
Mathur et al.

(10) Patent No.: US 9,598,070 B2
(45) Date of Patent: Mar. 21, 2017

(54) INFOTAINMENT SYSTEM CONTROL

(75) Inventors: Bhavna Mathur, Novi, MI (US); Andrew W. Gellatly, Macomb, MI (US); Cody R. Hansen, Shelby Township, MI (US); John P. Weiss, Shelby Township, MI (US); Matthew M. Highstrom, South Lyon, MI (US); Robert D. Sims, Milford, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 1891 days.

(21) Appl. No.: 12/715,771

(22) Filed: Mar. 2, 2010

(65) Prior Publication Data

US 2011/0218711 A1 Sep. 8, 2011

(51) Int. Cl.
| | |
|---|---|
| *B60W 10/30* | (2006.01) |
| *G01C 21/00* | (2006.01) |
| *H04B 3/20* | (2006.01) |
| *H04M 1/00* | (2006.01) |
| *H04N 7/16* | (2011.01) |
| *H04N 7/18* | (2006.01) |
| *H04R 25/00* | (2006.01) |

(52) U.S. Cl.
CPC ........... *B60W 10/30* (2013.01); *G01C 21/00* (2013.01); *H04B 3/20* (2013.01); *H04M 1/00* (2013.01); *H04N 7/16* (2013.01); *H04N 7/18* (2013.01); *H04R 25/00* (2013.01)

(58) Field of Classification Search
CPC ............. H04M 1/00; H04N 7/16; H04N 7/18
USPC ...................... 701/48, 200; 381/66
See application file for complete search history.

(56) References Cited

U.S. PATENT DOCUMENTS

| | | | | |
|---|---|---|---|---|
| 7,012,652 | B1 * | 3/2006 | Weber ...................... | H04N 5/44 348/632 |
| 7,406,543 | B2 * | 7/2008 | Menninger ............. | H04L 29/06 709/223 |
| 8,135,506 | B2 * | 3/2012 | Hansen ............... | G06F 17/3056 701/29.1 |
| 2007/0213092 | A1 * | 9/2007 | Geelen ................. | G08G 1/0969 455/556.1 |

(Continued)

FOREIGN PATENT DOCUMENTS

| | | |
|---|---|---|
| DE | 4140864 A1 | 6/1992 |
| DE | 4433953 A1 | 3/1996 |

(Continued)

OTHER PUBLICATIONS

German Office Action for application No. DE102011012400.4; Mailing Date Jan. 27, 2016, 7 pages.

*Primary Examiner* — Thomas G Black
*Assistant Examiner* — Wae Louie
(74) *Attorney, Agent, or Firm* — Cantor Colburn LLP

(57) ABSTRACT

An embodiment an infotainment system for an automobile includes a navigation system, an entertainment system, an audio output device and a control system coupled to the navigation system, the entertainment system and the audio output device. The control system controls access by the navigation system and the entertainment system to the audio output device and includes a conversation recognizer that determines if a conversation is being conducted. The control system of this embodiment varies operation of the audio output device in the event a conversation is being conducted.

10 Claims, 5 Drawing Sheets

(56) References Cited

U.S. PATENT DOCUMENTS

2011/0218711 A1\* 9/2011 Mathur ................ B60W 10/30
 701/48

FOREIGN PATENT DOCUMENTS

| DE | 4444443 A1 | 6/1996 |
|----|------------|--------|
| DE | 19507997 A1 | 9/1996 |
| DE | 19802220 A1 | 7/1999 |
| DE | 19821163 A1 | 11/1999 |
| DE | 19948612 A1 | 4/2000 |
| DE | 19919216 A1 | 11/2000 |
| DE | 10052654 A1 | 5/2002 |
| DE | 10060736 A1 | 6/2002 |
| DE | 10144752 A1 | 3/2003 |
| DE | 10153987 A1 | 5/2003 |
| DE | 19951001 C2 | 6/2003 |
| DE | 10123179 A1 | 11/2003 |
| DE | 10340870 A1 | 4/2005 |
| DE | 102005003535 A1 | 8/2006 |
| EP | 0903264 A1 | 3/1999 |
| EP | 1182089 A2 | 2/2002 |
| WO | 02088824 A2 | 11/2002 |

\* cited by examiner

INFOTAINMENT SYSTEM CONTROL

FIELD OF THE INVENTION

The invention relates to automobiles and, more particularly, to controlling the delivery operation of an infotainment system in an automobile.

BACKGROUND

Automobiles, including, cars and trucks, have long included entertainment systems. In particular, automobiles have long included radio tuners, compact disk players, and other means of delivering audio entertainment to passengers. Either a knob or buttons on the steering wheel typically control the volume of entertainment systems.

An automotive navigation system is a satellite navigation system designed for use in automobiles. A navigation system typically uses a global positioning system (GPS) navigation device to acquire position data to locate the automobile on a road in the unit's map database. Using the map database, the unit can give directions to other locations along roads also in its database.

In some automobiles, the entertainment system is coupled to the navigation system. This allows the navigation system to provide audio direction prompts ("prompts") to the passengers utilizing the speakers coupled to the entertainment system. A system having both entertainment and navigation capabilities shall be referred to herein as an "infotainment" system.

In operation, the infotainment system typically provides entertainment at a user selected volume level. The user must typically either turn a knob or depress a button to vary the volume. In some cases, the entertainment and navigation systems may operate at different volume levels.

It has been noticed, however, that conversations between passengers may be interrupted by navigation prompts and/or entertainment content. This may lead to, for example, users missing navigation prompts because the user was in a conversation when the prompt was delivered. In addition, users may be forced to turn down radio volume and/or navigation prompts when having a conversation in the vehicle. In some cases, the user may actually silence the navigation prompts to avoid having conversations interrupted.

SUMMARY

In an embodiment an infotainment system for an automobile is provided. The system of this embodiment includes a navigation system, an entertainment system, an audio output device and a control system coupled to the navigation system, the entertainment system and the audio output device. The control system controls access by the navigation system and the entertainment system to the audio output device and includes a conversation recognizer that determines if a conversation is being conducted. The control system of this embodiment varies operation of the audio output device in the event a conversation is being conducted.

Another embodiment of the present invention is directed to a method of operating an infotainment system in an automobile wherein the infotainment system includes at least a navigation system and an entertainment system. The method of this embodiment includes: receiving at a computer based control system of the infotainment system a navigation prompt; receiving at the computer based control system a play prompt command from the navigation system to play the navigation prompt; determining that a conversation is being conducted by at least one passenger in the automobile; and delaying the navigation prompt from being played on an audio output device during at least a portion of the conversation.

Another embodiment of the present invention is directed to a computer program product including a computer readable medium with program segments for, when executed on a computer device, causing the computer device to implement a method for operating an infotainment system. The method includes: receiving a navigation prompt; receiving a play prompt command from the navigation system to play the navigation prompt; determining that a conversation is being conducted by at least one passenger in the automobile; and delaying the navigation prompt from being played on an audio output device during at least a portion of the conversation.

The above features and advantages, and other features and advantages of the present invention are readily apparent from the following detailed description of the best modes for carrying out the invention when taken in conjunction with the accompanying drawings.

DESCRIPTION OF THE EMBODIMENTS

Figure 1:
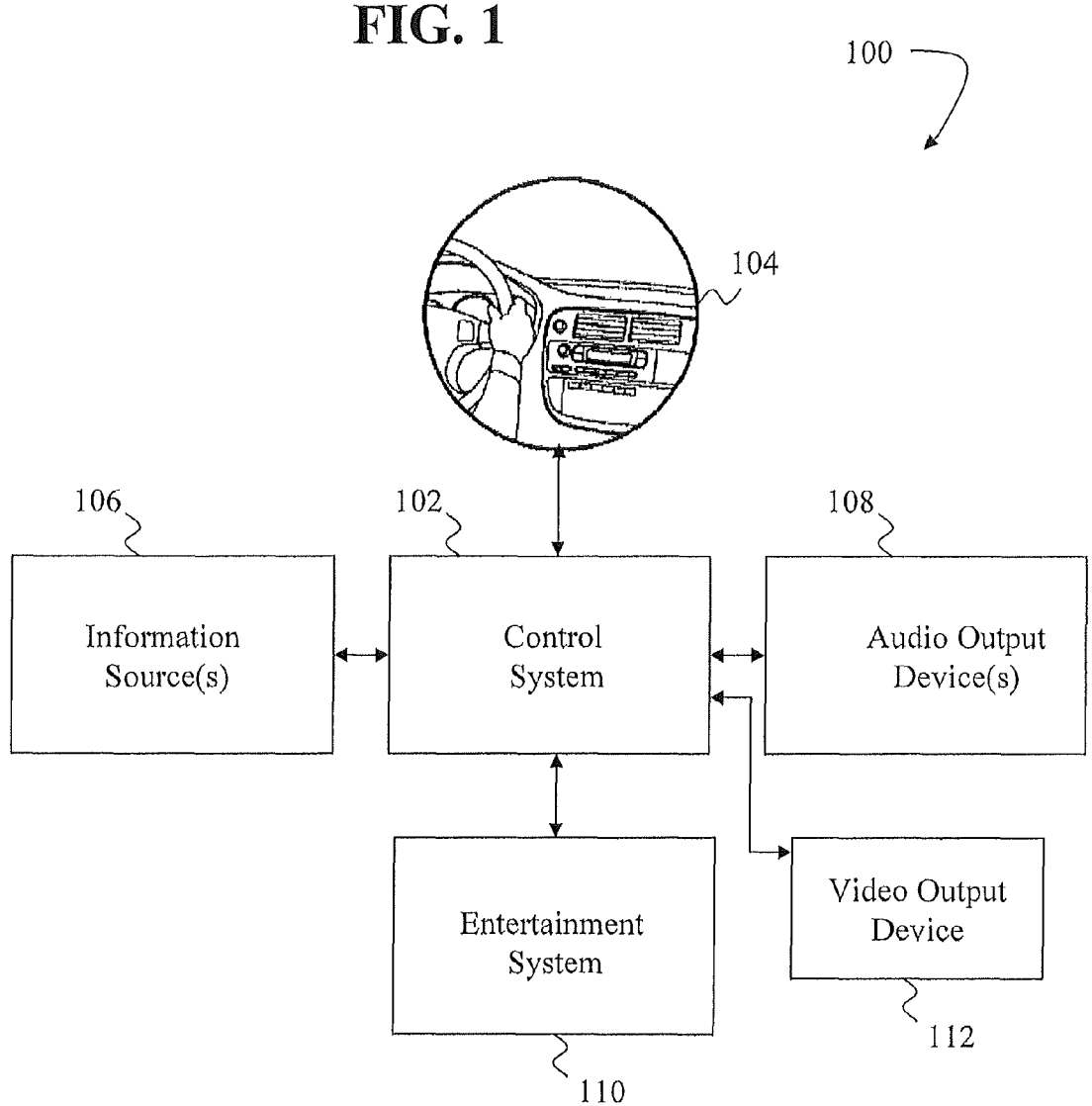
FIG. 1 shows an example of an infotainment system that may be implemented in an automobile.

The following description is merely exemplary in nature and is not intended to limit the present disclosure, application or uses. It should be understood that throughout the drawings, corresponding reference numerals indicate like or corresponding parts and features.

Some of the above described shortcomings or problems may be overcome or lessened by one or more embodiments disclosed herein. In particular, an embodiment is directed to an infotainment system that monitors for conversation levels in an automobile and adjusts the audio volume for one or both the entertainment and navigation system. In a particular embodiment, the infotainment system identifies a break/pause in the conversation before announcing a navigation prompt to avoid the user missing the prompt but being sensitive to the conversations in the automobile. This may prevent or reduce interruption of conversations in the automobile that may cause the user to turn off the navigation voice prompts or manually adjust the volume.

In an embodiment, the navigation system listens to the conversation and waits for a break in the conversation before providing a prompt. This also helps prevent the case where the user is in the middle of a conversation and misses an audible maneuver prompt because he or she talked over it. If the prompt can be better delivered, this may reduce the number of missed prompts. The system may also use the conversation detection system to deliver navigation prompts in a polite fashion while it interrupts the conversation. For example, if a conversation is being interrupted, an "excuse me" may precede a navigation prompt.

In accordance with an exemplary embodiment, FIG. 1 schematically illustrates an infotainment system 100 that may be utilized, for example, in an automobile (not shown). While the following discussion is based on implementation in an automobile, the teachings herein may be applied in other contexts. For example, the infotainment system 100 could be utilized on a motorcycle, all-terrain vehicle, or in a home entertainment system.

The infotainment system 100 (also referred to generally herein as "system") may include an infotainment control system 102. The control system 102 receives inputs from various sources and controls access to the audio output device(s) 108.

The control system 102 may receive input signals from an information system 106. The information system 106 may include, but is not limited to, a navigation system, a personal digital assistant (PDA), a radio tuner, a cellular telephone, an Internet connection, a microphone, or any other device capable of providing information to the control system 102.

The control system 102 may also receive input signals from an entertainment system 110. The entertainment system 110 may include, but is not limited to, one or more of a compact disk (CD) player, a radio tuner, a digital video disk (DVD) player, a portable media player, or other now available or later created devices that provide entertainment.

In order for the information or entertainment provided by the information source 106 or entertainment system 110 to be experienced by a passenger, the control system 102 provides the information or entertainment to one or both of the audio output 108 or video output 112. The audio output 108 may be a system of one or more speakers and the video output 112 may be, for example, one or more display screens located at one or more locations in the automobile.

Typically, a user may control some or all of the infotainment system 100 through a user input device 104. Based on inputs received from the user input device 104, the control system 102 may determine the device that has access to one or both of the outputs 108 and 112 and a volume level for at least the audio output 108.

Figure 2:
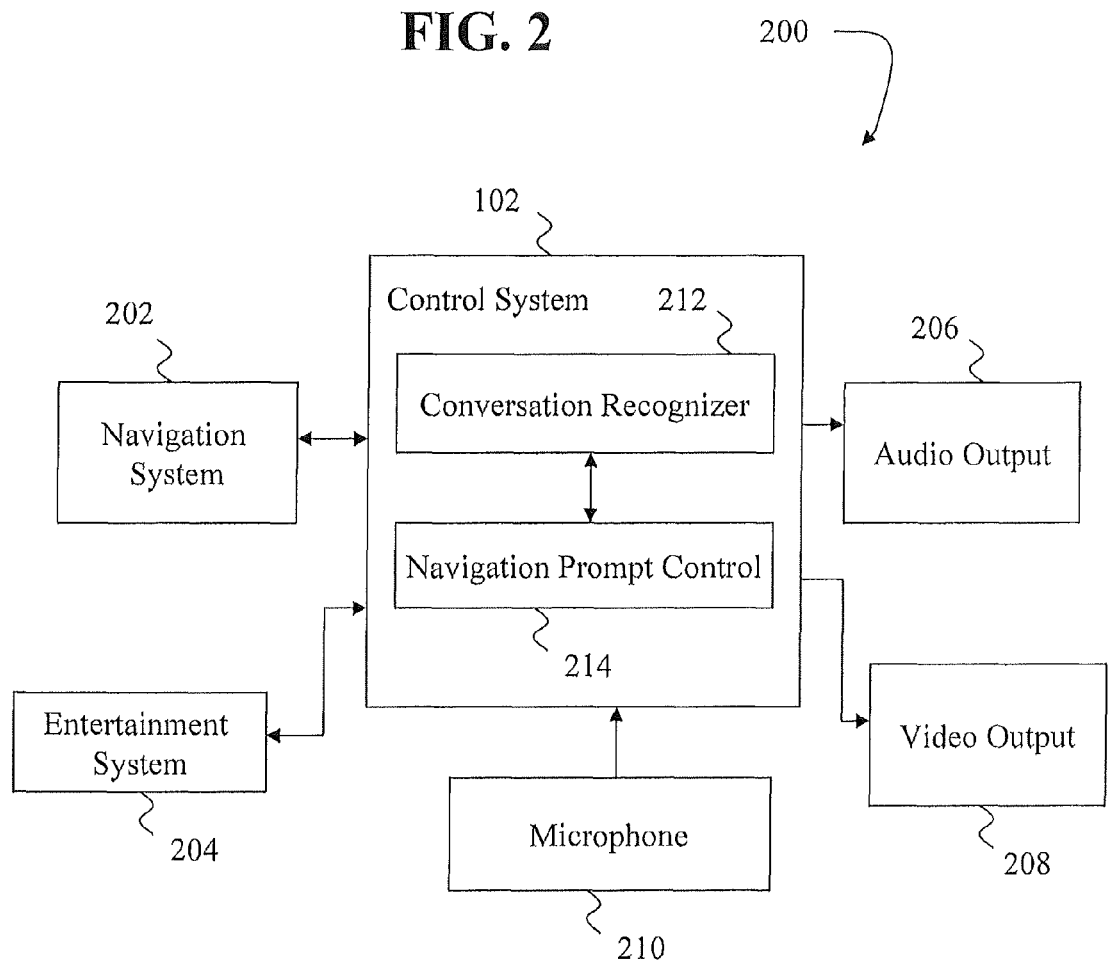
FIG. 2 shows a more detailed infotainment system according to an embodiment of the invention.

FIG. 2 shows a more detailed schematic of an infotainment system 200 according to an embodiment of the present invention. The system 200 includes a control system 102. The control system 102 receives inputs from various sources and controls access to the audio output(s) 206 (typically speakers) and also, optionally, to video output 208.

The system 200 may include an entertainment system 204. The entertainment system 204 provides at least audio information to the control system 102. The control system 102 may vary the volume of the audio information before providing it to the audio output 206.

In an embodiment, the system 200 may include a microphone 210 coupled to the control system 102. The microphone 210 may, for example, be located in the passenger compartment of an automobile. The microphone 210 senses the sounds in the passenger compartment and provides them to the control system 102. In an embodiment, the control system 102 may include a conversation recognizer 212 that is configured to recognize when a conversation is being conducted in the passenger compartment. In an embodiment, when the conversation recognizer 212 determines that a conversation is being conducted, the control system 102 may cause a variation in audio output 206. For example, the control system 102 may lower the volume of the audio output 206. In a particular embodiment, the control system 102 may lower the volume of the audio output 206 when the audio output 206 is reproducing information received from an entertainment system. In such an embodiment, the control system may increase the volume of the audio output 206 when the conversation recognizer 212 indicates that the conversation is no longer being conducted.

The system may also include a navigation system 202. The navigation system 202 may include a global positioning system (GPS) navigation device to acquire position data to locate the automobile on a road in the unit's map database. Using the map database, the unit can give directions to other locations along roads also in its database. The directions may be given as a series of audio prompts ("prompts"). The control system 102 receives these prompts and, generally, provides them to the audio output 206.

As discussed above, it has been noticed that conversations (between passengers, on a telephone, or otherwise) may be interrupted by navigation prompts. Such interruptions may be undesirable. In some cases, to avoid such interruptions, users may silence the navigation prompts to avoid having conversations interrupted.

The control system 102 may include a navigation prompt controller 214. The navigation prompt controller 214 receives the prompts from the navigation system 202 and determines if and when to convey them to the audio output 206. For example, if a prompt is received, it may be delayed until it is determined that a previously started conversation has ended. When the conversation has ended, the prompt may be played. However, in some instances the conversation may not end in time. In an embodiment, in such an instance, the navigation prompt controller 214 may interrupt the conversation but it may do so by including a polite introduction to the prompt. For example, the prompt may be preceded by, the phrase "excuse me," or "sorry to interrupt, but . . . ."

Figure 3:
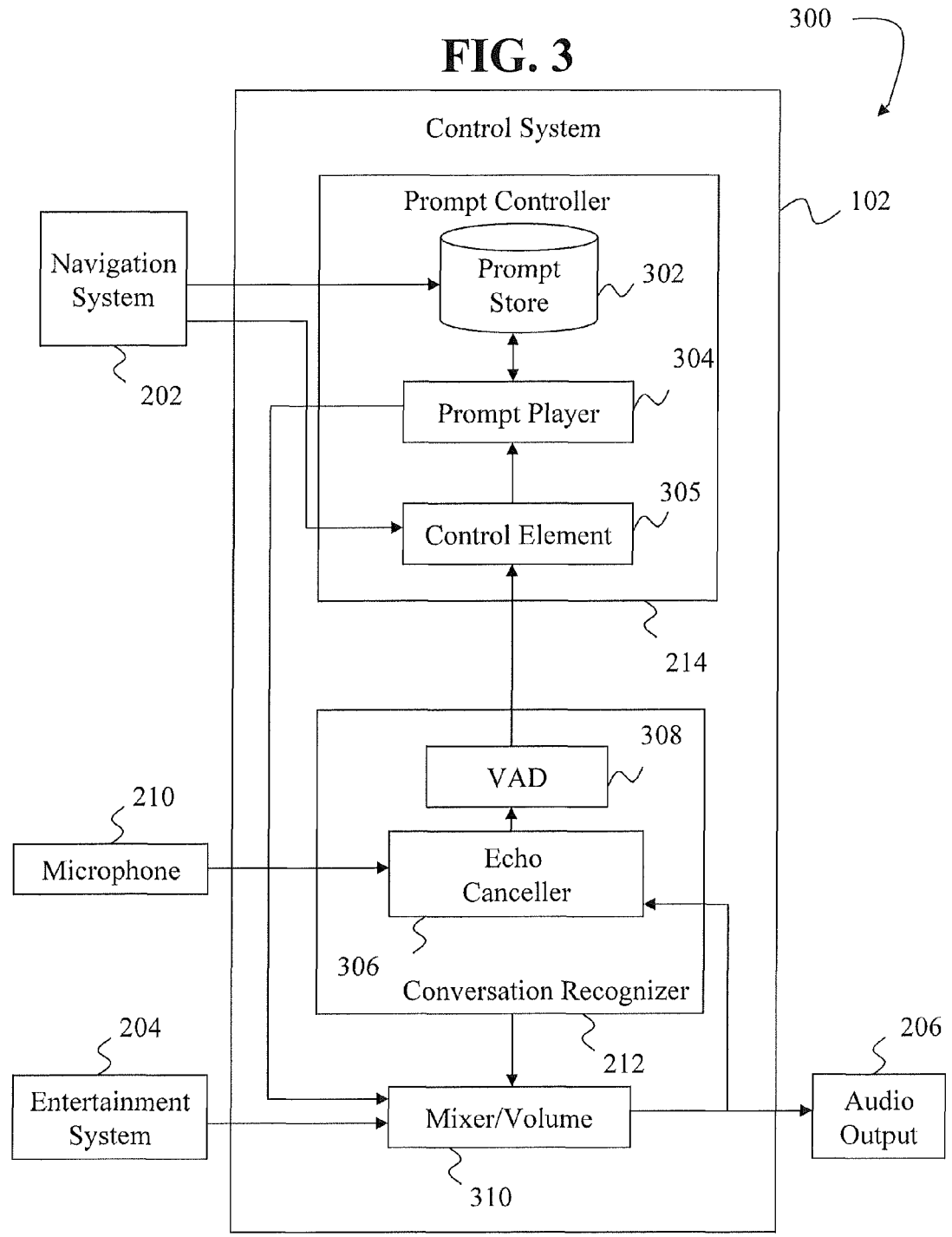
FIG. 3 shows a more detailed system diagram of a portion of the system shown in FIG. 2.

FIG. 3 shows a more detailed system diagram of a portion of the system shown in FIG. 2. System 300 shown in FIG. 3, includes a navigation system 202, a microphone 210, an entertainment system 204, control system 102 and an audio output 206.

The microphone 210 may continually sample the sounds in the passenger compartment of an automobile in an embodiment. In such an embodiment, the system 300 may include the above-mentioned functionality of reducing the volume of the audio output 206 whenever a conversation is detected. Of course, in some embodiments, the microphone 210 may only operate in certain time periods to conserve power or computing cycles. These time periods may include, for example, a time after a prompt is received from the navigation system and until that prompt is delivered.

To determine whether a conversation is being conducted in the automobile, the control system 102 may include a conversation recognizer 212. In an embodiment, in the event that that the conversation recognizer 212 determines that a conversation is being conducted, it may signal the mixer/volume controller 310 to reduce the volume of the signal provided to the audio output 206. In addition, the mixer/volume controller 310 may control which of many inputs received is provided to or dominates the signal provided to the audio output 206.

The conversation recognizer 212 may include an echo canceller 306. The echo canceller 306 may be coupled to an output of the mixer/volume controller 310. That is, the echo canceller 306 receives information representative of the audio information being conveyed to the audio output 206. The echo canceller 306 also receives information from the microphone 210. Echo cancellation involves first recognizing the originally transmitted signal that re-appears, with some delay, in the transmitted or received signal. Once the echo is recognized, it can be removed by 'subtracting' it from the transmitted or received signal. This technique is generally implemented using a digital signal processor (DSP), but can also be implemented in software. Here, the originally transmitted signal is received from the mixer 310. The originally transmitted signal is then removed from the signal received from the microphone 210 by the echo canceller 306.

The echo canceller 306 provides the signal from the microphone, with the signal provided to the audio output 206 removed there from (echo free signal), to a voice activity detector (VAD) 308. The VAD 308, in general, determines when a conversation is being conducted in the automobile. Voice activity detection (also known as speech activity detection or, more simply, speech detection) is a technique used in speech processing wherein the presence or absence of human speech is detected in regions of audio (which may also contain music, noise, or other sound). Voice activity detection is an important enabling technology for a variety of speech-based applications. Therefore, various detection algorithms have been proposed that provide different compromises between latency, sensitivity, accuracy and computational cost. Some algorithms also provide further analyses, for example whether the speech is voiced, unvoiced or sustained. Voice activity detection is usually language independent. The VAD 308 may utilize any known or later developed speech detection algorithms.

The VAD 308 may cause the conversation recognizer 212 to cause the mixer/volume controller 310 to attenuate the volume of the audio output 206 in the event that conversation is being conducted. In an embodiment, the volume may remain attenuated until the conversation ends. Such functionality may always be operating or may be selectively activated or deactivated.

The control system 102 may include prompt controller 214. The prompt controller 214, generally receives, stores, and provides navigation prompts to the audio output 206. In particular, the prompt controller 214 may receive navigation prompts from the navigation system 202. In an embodiment, the prompt controller 214 may include a prompt store 302 in which the navigation prompts may be stored. The navigation prompts in the prompt store may be read out and transmitted to the occupants via a prompt player 304. The prompt player 304 may receive instructions from the prompt control element 305. The prompt control element 305 may receive indications of when to cause a prompt to be played from the navigation system 202 and when to pause or delay a prompt from the VAD 308.

In operation, prior to the invention disclosed herein, the navigation system 202 may have either provided an ordered list of prompts to be played whenever the automobile was in specific locations or may have generated the prompts as the locations were reached. Regardless, no consideration was given to whether the persons were speaking (having a conversation) before the prompts were played. This may, in some instances, have lead to missed prompts or passengers disabling the navigation system (or at least the audio portions thereof).

In an embodiment, the prompt control element 305 may be configured to delay or otherwise vary the timing of a prompt based on whether a conversation is being conducted. That is, in an embodiment, determining that a conversation is being conducted may also affect operation of the prompt controller 214. In such an embodiment, the VAD 308 may provide a "speech detected" indication to the prompt control element 305. The prompt control element 305 may, in an embodiment, inhibit the prompt player 304 from providing a prompt stored in the prompt store 302 to the mixer 310 until the VAD 308 determines that the speech has finished. In an embodiment, the speech/conversation may need to be completed for a minimum duration of time until the VAD 308 indicates that the conversation is complete. That is, a preset period of silence may be required before the VAD 308 indicates that a conversation is complete in order to allow for short pauses in the conversation.

Figure 4:
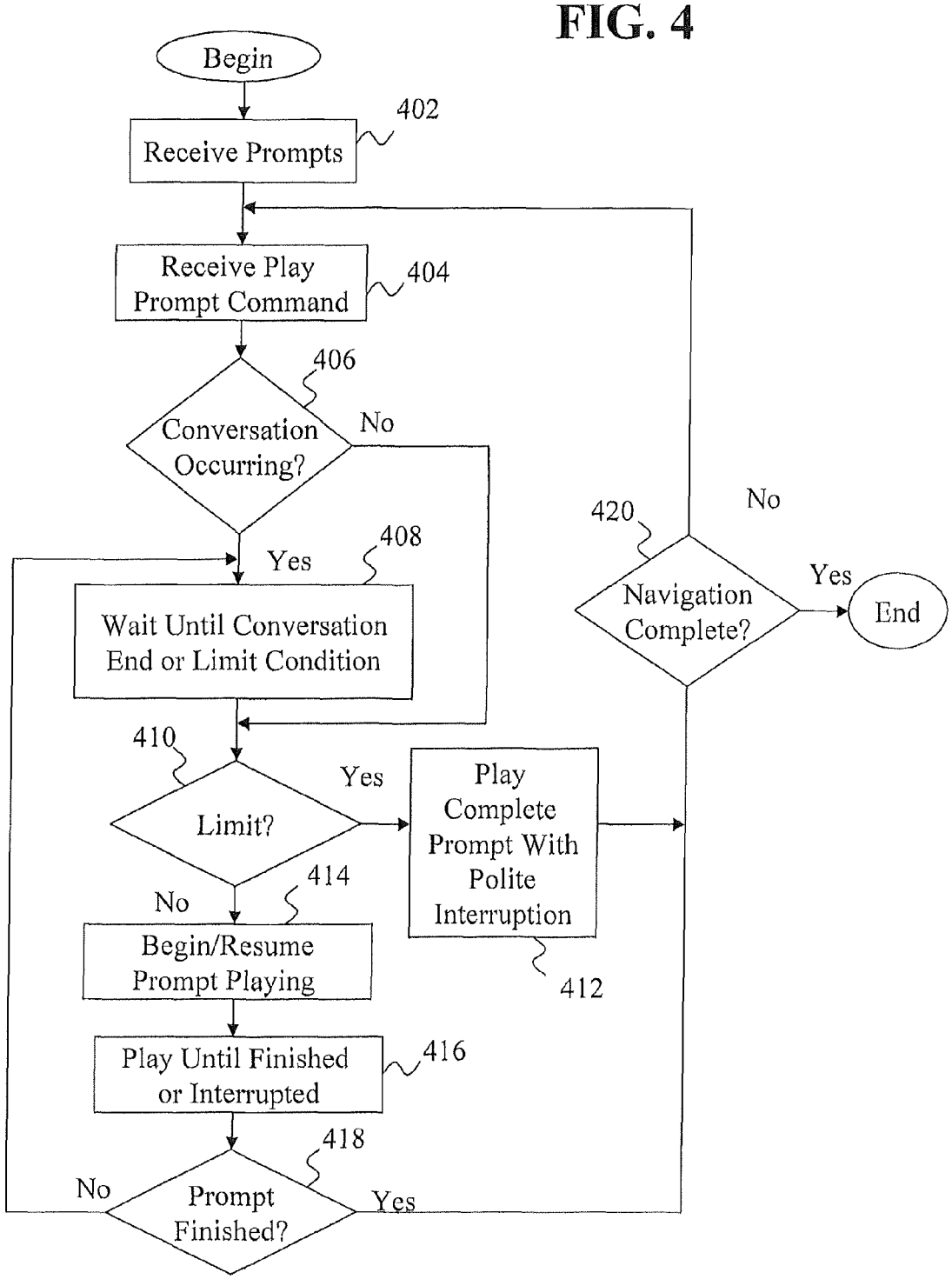
FIG. 4 shows a method of operating an infotainment system according to an embodiment of the invention.

FIG. 4 shows a flow diagram of a method that may be implemented, in an embodiment, by the prompt control element 305. The state diagram shown in FIG. 4 will refer to the system shown in FIG. 3. The method is initiated, in an embodiment, when the navigation system 202 has been enabled and a destination selected. The navigation system 202 will then provide one or more prompts, at a block 402, to the prompt store 302. The prompts may be provided as an ordered list or may be received sequentially.

At a block 404 a play prompt command is received. In an embodiment, the navigation system 202 may provide the play prompt command based on a location of the automobile. In an embodiment, the play prompt command is provided either as part of or at the same time the prompts are received at block 402. In an embodiment, the prompts may be previously stored and have identifiers on them. In such an embodiment, the prompt command may then consist only of an identifier.

Regardless of the manner in which the prompt is received, at a block 406, it is determined if a conversation is being conducted. It may be beneficial to only operate the conversation recognizer 212 after a play prompt command has been received due to power and processing constraints. The conversation recognizer 212 may, however, run all of the time in an embodiment.

In the event that a conversation is occurring, at a block 408, the prompt is paused. That is, the prompt is either not started or is paused until the conversation is concluded. It should be understood, however, that there may exist in some embodiments, a location-based limit condition that may be placed on the pausing of a prompt. For example, a prompt may be delayed until the automobile has reached a specified minimum distance before a driver action is to be taken. In such an embodiment, block 408 may cause delay until the conversation is concluded or until the limit condition is reached. Of course, the limit functionality may be optional or a feature which may be enabled or disabled by a user.

In the event that a limit functionality is enabled or otherwise available, at a block 410 it is determined whether the limit has been reached or the conversation has ended. If it was a limit that caused the process to move from block 408 to block 410, at a block 412 the prompt is played. In an embodiment, because it is known that this prompt will be played while a conversation is ongoing, a polite interrupt may be added. In an embodiment, at block 412 the entire prompt is played. After the prompt is played, control is passed to block 420 described below.

In the event that the conversation has ended (i.e., the block 410 did not determine that a limit had been reached), at a block 414 the prompt is started or a delayed prompt is resumed. At a block 416, the prompt is played until it is completed or until it is interrupted by a conversation. If the prompt is interrupted by a conversation, as determined at block 418, processing returns to block 408. Otherwise, block 418 determines that the prompt is complete and, at a block 420 it is determined if the navigation is complete. This may include, for example, receiving a signal that the navigation is complete. If the navigation is complete, the process ends. Otherwise, processing returns to block 404.

Figure 5:
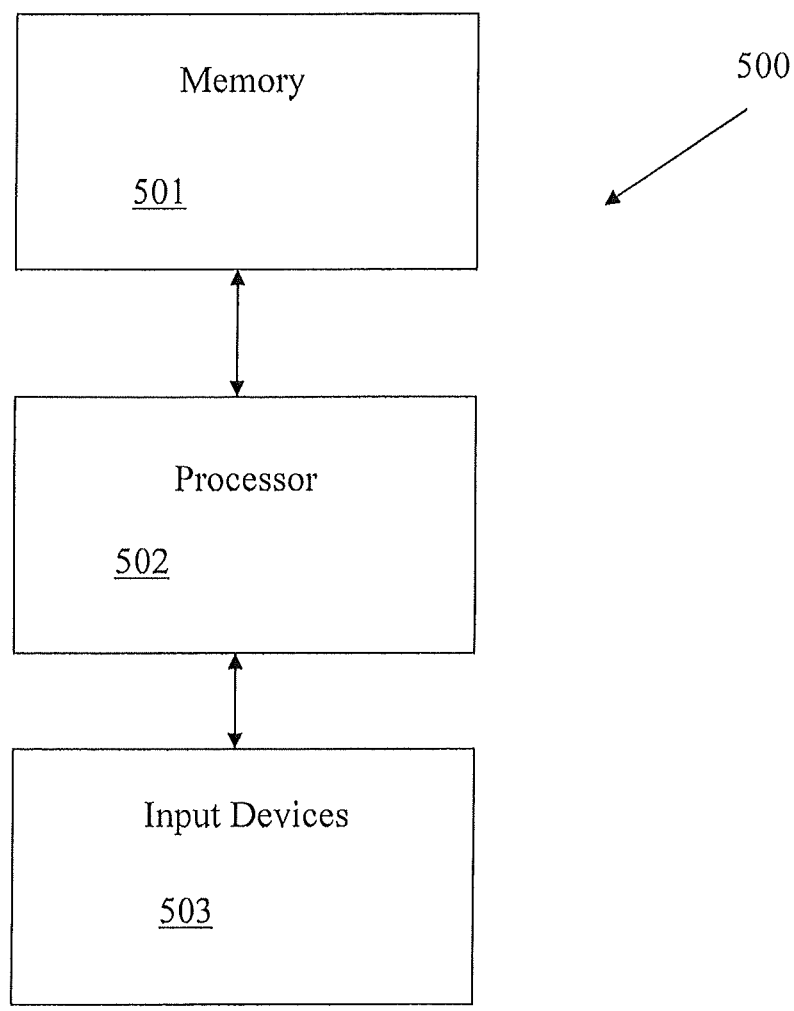
FIG. 5 shows a block diagram of a computing system on which embodiments of the present invention may be implemented.

It is further noted that embodiments of the invention may be embodied in the form of computer-implemented processes and apparatuses for practicing those processes. Therefore, according to an exemplary embodiment, the methodologies described hereinbefore may be implemented by a computer system or apparatus. For example, FIG. 5 illustrates a computer system, according to an exemplary embodiment. Therefore, portions or the entirety of the methodologies described herein may be executed as instructions in a processor 502 of the computer system 500. The computer system 500 includes memory 501 for storage of instructions and information, and input device(s) 503 for computer communication. Thus, the present invention may be implemented, in software, for example, as any suitable computer program on a computer system somewhat similar to computer system 500. For example, a program in accordance with the present invention may be a computer program product causing a computer to execute the example methods described herein. In an embodiment, the computer system 500 may form some or all of the infotainment system described above. In an embodiment, the computer system 500 may form some of all of the control system 102 described above.

The computer program product may include a computer-readable medium having computer program logic or code portions embodied thereon for enabling a processor (e.g., 502) of a computer system (e.g., 500) to perform one or more functions in accordance with one or more of the example methodologies described above. The computer program logic may thus cause the processor to perform one or more of the example methodologies, or one or more functions of a given methodology described herein.

The computer-readable storage medium may be a built-in medium installed inside a computer main body or removable medium arranged so that it can be separated from the computer main body. Examples of the built-in medium include, but are not limited to, rewriteable non-volatile memories, such as RAMs, ROMs, flash memories, and hard disks. Examples of a removable medium may include, but are not limited to, optical storage media such as CD-ROMs and DVDs; magneto-optical storage media such as MOs; magnetism storage media such as floppy disks (trademark), cassette tapes, and removable hard disks; media with a built-in rewriteable non-volatile memory such as memory cards; and media with a built-in ROM, such as ROM cassettes.

While the invention has been described with reference to exemplary embodiments, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiments disclosed, but that the invention will include all embodiments falling within the scope of the present application.

What is claimed is:

1. An infotainment system for an automobile, the system comprising:
a navigation system;
an entertainment system;
an audio output device; and
a control system coupled to the navigation system, the entertainment system and the audio output device, the control system controlling access by the navigation system and the entertainment system to the audio output device, the control system including a conversation recognizer that determines if a conversation is being conducted, the control system varying operation of the audio output device in the event a conversation is being conducted, wherein the control system varies operation of the audio output device by delaying a navigation prompt from being played on the audio output device during at least a portion of the conversation;
wherein the navigation prompt is delayed for a portion of the conversation until a location-based limit is reached.

2. The infotainment system of claim 1, further including:
a microphone; and
wherein the conversation recognizer includes an echo canceller that receives an original signal from the microphone and removes the output of the audio output device from the original signal to create an echo free signal.

3. The infotainment system of claim 2, wherein the conversation recognizer further includes a voice activity detector coupled to the echo canceller that determines if a conversation is present in the echo free signal.

4. The infotainment system of claim 1, wherein the control system includes a prompt controller that stores prompts and controls when a prompt is played.

5. The infotainment system of claim 4, wherein the prompt controller includes a prompt store that stores prompts received from the navigation system, a prompt player that causes prompts to be provided to the audio output device and a prompt control element coupled to the prompt player and the conversation recognizer that controls when the prompt player causes prompts to be provided to the audio output device.

6. The infotainment system of claim 1, wherein the control system further includes a mixer that receives an indication from the conversation recognizer that a conversation has been detected and causes the volume of the audio output device to be reduced.

7. A computer based method of operating an infotainment system in an automobile, the infotainment system including at least a navigation system and an entertainment system, the method comprising:
receiving at a computer based control system of the infotainment system a navigation prompt;
receiving at the computer based control system a play prompt command from the navigation system to play the navigation prompt;
determining that a conversation is being conducted by at least one passenger in the automobile; and
delaying the navigation prompt from being played on an audio output device during at least a portion of the conversation;
wherein the audio prompt is delayed until a navigation-based limit is reached.

8. The method of claim 7, wherein the audio prompt is supplemented with a polite introduction.

9. A computer program product including a computer readable medium with program segments for, when executed on a computer device, causing the computer device to implement a method for operating an infotainment system, the method comprising:
receiving a navigation prompt;

receiving a play prompt command from the navigation system to play the navigation prompt;

determining that a conversation is being conducted by at least one passenger in the automobile; and delaying the navigation prompt from being played on an audio output device during at least a portion of the conversation;

wherein the audio prompt is delayed until a navigation-based limit is reached.

10. The computer program product of claim 9, wherein the audio prompt is supplemented with a polite introduction.

* * * * *